INVENTOR.
JAMES W. HENDRY
BY
Woodhams, Blanchard & Flynn
ATTORNEYS

United States Patent Office 3,358,334
Patented Dec. 19, 1967

3,358,334
PLASTIC WORKING MACHINE IMPELLING MATERIAL TO BE WORKED AGAINST A ROTATING CONE
James W. Hendry, Fremont, Ohio, assignor to Borg-Warner Corporation, Chicago, Ill., a corporation of Illinois
Filed Jan. 30, 1967, Ser. No. 612,676
32 Claims. (Cl. 18—30)

ABSTRACT OF THE DISCLOSURE

This invention relates to a plasticizing machine, particularly operable in association with other parts as an injection machine, and including a plasticizing chamber having a rotatably driven conical member disposed adjacent an annular conical seat. The zone around the apex of the conical member communicates with pressure creating feeding means for forcing material into and through the narrow annular space between the rotating conical member and the seat whereby the material is plasticized by frictional working therebetween. Passage means adjacent the base end of the conical member allow plasticized material to enter utilizing means, such as an injection cylinder. The injection cylinder is filled to the desired volume, the conical member is then stopped, and the cylinder is actuated to inject the plasticized material into a mold.

This application is a continuation-in-part of application Ser. No. 368,085, filed May 18, 1964 and now abandoned.

This invention relates to a plasticizing machine for plastic material and more particularly relates to a machine in which raw plastic material is fed under pressure past a rotating mulling member which in turn plasticizes said material for feeding to utilizing means, especially to pressure injection means.

Plastic materials used in injection molding, including both thermoplastic and thermosetting types, vary widely in their ability to tolerate elevated temperatures. Some otherwise desirable plastic materials, such as unplasticized polyvinylchloride, polyoxymethylene and acrylonitrile-butadiene-styrene copolymers are moldable over a particular limited temperature range. Thus, careful control is required to maintain such materials in a moldable condition, a small drop in temperature making same unmoldable and a small rise in temperature resulting in decomposition of said material, as through charring. Such decomposition has often occurred in previous machines due to uneven working of the material. The decomposed material is often in the form of small flecks of black char entrained in the moldable material to produce a faulty molded product. Since the flecks are small, a large number of such defective molded products may be produced before the faulty operation of the plasticizing machine is discovered, with the result of much expensive wastage.

Certain materials are known which are capable of remaining at a moldable temperature for only a limited period of time before changing to a different state. Such materials may become prematurely hard or may decompose to produce undesirable product materials capable of ruining the color or surface texture of the finished molded piece. Such materials have been particularly troublesome when used in plasticizing machines having dead corners where material can built up from cycle to cycle or where a significant amount of material remains in the machine at the end of a plasticizing cycle.

Certain plastics become corrosive upon disintegration and thus require that the plasticizing machine be cleaned between cycles. This has been particularly expensive in many previous plasticizing machines where a machine has been difficult to disassemble due to its design and/or the size of its component parts, as when a large plasticizing screw is used, and also in cases where the parts are of complex configuration including many crevices, corners and the like.

Certain prior art plasticizing machines utilize a continuously rotating plasticizing element, the plasticized material being fed to an intermittently operated injection molding device. Due to the continuous rotation of the plasticizing element, an accumulation chamber must in such machines be provided intermediate the plasticizing element and the injection molding device, which chamber is utilized as a receptacle for the plasticized material and for intermittently feeding the plasticized material to the injection device. However, intermediate accumulating chambers are highly undesirable since they result in an increased number of dead corners and passages where material can build up from cycle to cycle. Further, since some materials are capable of remaining at a moldable temperature for only a limited period of time, use of an intermediate chamber often results in some of the material becoming prematurely hard or decomposed before being finished into a molded article. Furthermore, such chambers generally require additional heating in order to maintain the material therein in a moldable condition. This additional heating often results in a decomposition of a material, or hardening thereof, due to the difficulty in maintaining accurate control over the temperature within the chamber. Thus, machines utilizing intermediate accumulation chambers generally result in much wasted material and further require frequent maintenance and repair in order to remove the decomposed material therefrom so as to result in a uniform and clean molded product.

Accordingly, the objects of the invention include:

(1) To provide a plasticizing machine capable of plasticizing materials for molding and particularly capable of plasticizing sensitive materials rapidly and without appreciable degradation or setting of the material within the machine.

(2) To provide a machine, as aforesaid, including a rotating head disposed closely adjacent to a conical seat and means forcing material radially outwardly between said head and said seat under pressure for plasticizing same by a mulling action, or more specifically by frictionally exerting shear forces thereon.

(3) To provide a machine, as aforesaid, in which said head and seat may be carried on relatively small and easily machined parts separate from the rest of the machine.

(4) To provide a machine, as aforesaid, including means for directing coolant fluid around both said seat and other material carrying passages of the machine as well as within said head to control the operating temperature of parts contacting said material, said machine further being capable of being equipped with heating elements to provide initial warming of the machine.

(5) To provide a machine, as aforesaid, wherein said head is axially adjustable with respect to said seat for adjusting the working clearance therebetween for handling different types of materials and to compensate for wear in said head and seat without disassembling the machine.

(6) To provide a machine, as aforesaid, in which said head is substantially conical for cooperation with said seat, in which material to be plasticized enters the space between said head and seat at such a point (namely, at the apex of said head) that the peripheral speed of said head at the first point of contact of the plastic material with said head is at a minimum and in which said material is then forced radially outwardly along the surface of said head and is thereby subjected to a continuously increasing peripheral speed differential and, hence, tends to be worked with progressively increasing heat development as it is moved through said space.

(7) To provide a machine, as aforesaid, in which the plasticizing occurs in a narrow zone between the conical head and said seat whereby plasticizing occurs by rapid heating, the narrow zone and the rapid heating permits the conical head to be intermittently rotated.

(8) To provide a machine, as aforesaid, in which the conical plasticizing head is intermittently rotated with the plasticizing material means supplied directly to a molding device, the rotating head being stopped during the actual molding operation, thus eliminating the need for any intermediate accumulation chamber between the plasticizing region and the molding device, thus resulting in a more efficient machine operation both in terms of maintenance and waste.

(9) To provide a machine, as aforesaid, in which all of the material plasticized is treated in a like manner, in which dead corners have been substantially eliminated to prevent build up of material within the machine from cycle to cycle and in which only a minimum of material remains in the machine at the end of a cycle of operation.

(10) To provide a machine, as aforesaid, whose parts can readily be separated from each other for cleaning and the like, which will be capable of a long service life with a minimum of maintenance and which can be maintained by relatively inexperienced personnel and a minimum cost.

(11) To provide a machine, as aforesaid, manufacturable in a wide variety of sizes and capacity, having parts which are considerably simplified over previously known plasticizing machines and which is capable of production in large or small quantities at relatively low cost.

Other objects and purposes of the invention will be apparent to persons acquainted with the machines of this general type upon reading the following disclosure and inspecting the accompanying drawings.

Certain terminology will be used in the following description for convenience in reference only and will not be limiting. The words "upwardly," "downwardly," "rightwardly" and "leftwardly" will designate directions in the drawings to which reference is made. The word "forwardly" will refer to the direction of the material flow through the device and the word "rearwardly" will refer to the opposite direction. The words "inwardly" and "outwardly" will refer to directions toward and away from, respectively, the geometric center of the device and designated parts thereof. Said terminology will include the words above specifically mentioned, derivatives thereof and words of similar import.

General description

In general, the objects and purposes of the invention are met by providing a plasticizing machine including a plasticizing chamber having an annular conical and constituting a seat and a rotatably driven conical member in said plasticizing chamber disposed adjacent said annular conical seat and axially adjustable with respect thereto for varying the distance therebetween. The zone around the apex of said conical member communicates with a pressure generating feeding means, such as means including a ram cylinder, into which material to be plasticized is fed. Said positive feeding means has suitable means therein which forces material into and through the narrow annular space, or plasticizing zone, between said rotating conical member and said seat, whereby said material is plasticized by frictional working therebetween. Passage means are provided adjacent the base end of the conical member for allowing plasticizing material exiting from said plasticizing zone to enter utilizing means, such as an injection cylinder. The injection cylinder, upon filling to any desired volume, may be then actuated to inject the plasticized material into a mold. During actuation of the injection cylinder, the rotating conical member is stopped to prevent further feeding of material into the injection cylinder.

Detailed description

Figure 1:
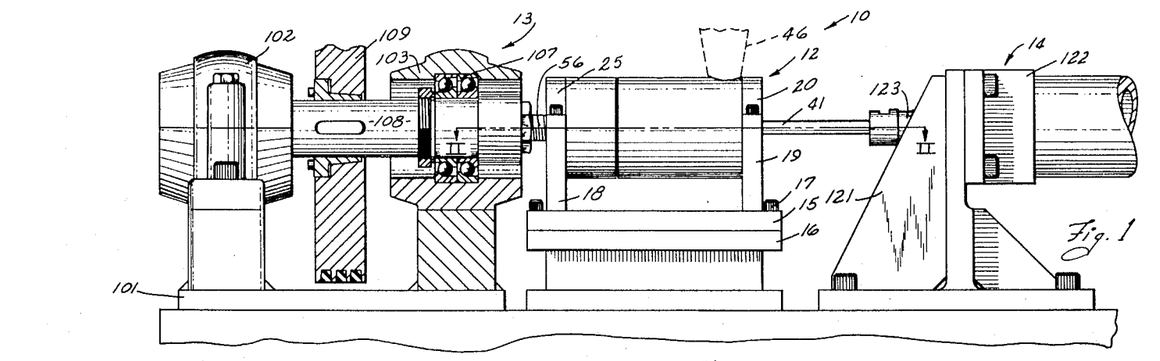
FIGURE 1 is a partially broken side elevational view of an injection molding machine embodying the invention.

Referring now to FIGURE 1, the plasticizing machine 10 embodying the invention comprises a plasticizing unit 12 located between intermittently operated rotation means 13 and reciprocation means 14.

Figure 2:
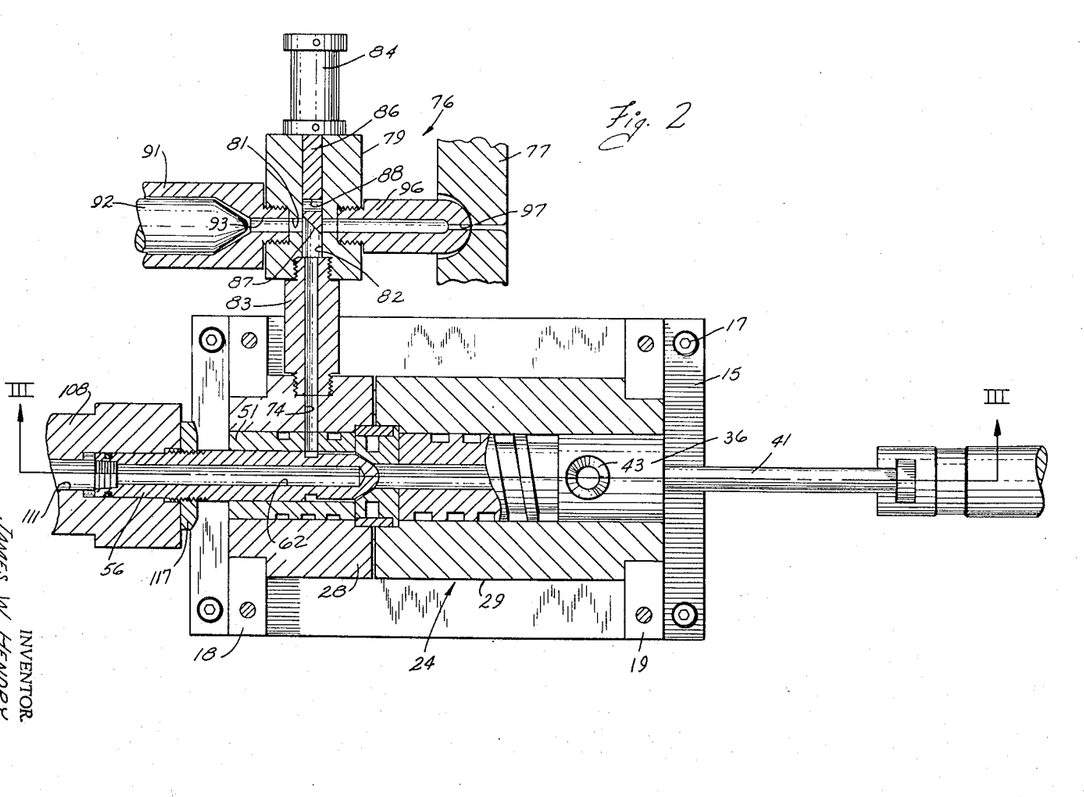
FIGURE 2 is a partially broken sectional view taken substantially on the line II—II of FIGURE 1.
Figure 3:
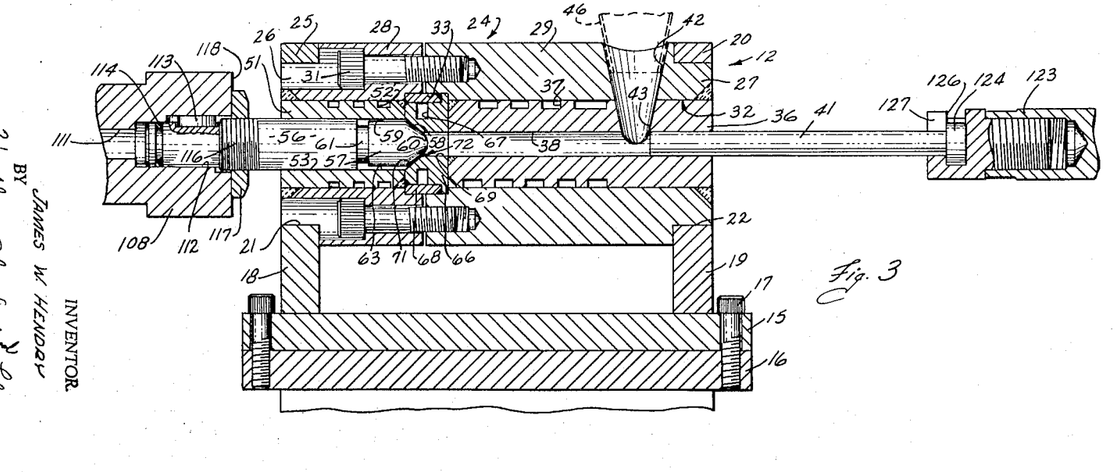
FIGURE 3 is a sectional view taken substantially on the line III—III of FIGURE 2.

Considering the plasticizing unit 12 in detail, and referring to FIGURES 2 and 3, the plasticizing unit 12 includes a base structure 16 of any convenient type. A mounting plate 15 is fixed upon the base structure 16 by screws 17. A spaced pair of parallel, upstanding members 18 and 19 are fixed to and supported on the mounting plate 15 and in turn support removably mounted caps 25 and 20, respectively, which cooperate with said members 18 and 19 to define coaxially aligned openings 21 and 22. A preferably cylindrical housing 24 has circular ends 26 and 27 snugly receivable in said openings 21 and 22 for fixedly supporting the housing 24 upon the upstanding members 18 and 19. The housing 24 comprises a pair of axially separable parts 28 and 29 held together by a plurality of axially extending, circumferentially spaced screws 31. A generally cylindrical central opening 32 extends axially through the housing 24. The central opening 32 has a radially enlarged portion 33 intermediate the ends thereof defined by suitable coaxial, opposed recesses in the adjacent internal faces of the parts 28 and 29.

A cylindrical feed block 36 is fixed within the rightward portion of the central opening 32 by any convenient means, such as welding. The feed block 36 extends from the rightward end of the central opening 32 leftwardly to the enlarged portion 33. Groove means 37, here a single spiral groove, in the peripheral surface of the feed block 36 define with the internal wall of the central opening 32 a passage suitable for conducting cooling fluid. The feed block 36 has a preferably coaxial and cylindrical ram chamber 38 extending therethrough for snugly and reciprocably receiving therewithin a ram 41 driven by the reciprocation means 14 (FIGURE 1). The housing 24 and feed block 36 (FIGURES 2 and 3) have coaxial feed openings 42 and 43, respectively, extending radially therethrough adjacent the rightward ends thereof for allowing communication between exterior material feeding means, such as the hopper indicated in broken lines at 46 (FIGURES 1 and 3), and the ram chamber 38.

A generally cylindrical transfer block 51 is fixed within the central opening 32 between the leftward end thereof and the enlarged portion 33 by any convenient means, such as welding. The transfer block 51 has groove means 52, preferably a single spiral groove, in the peripheral surface thereof for connecting cooling fluid.

A shaft opening 53 extends coaxially through the transfer block 51 and is coaxial, but is of greater diameter than, the ram chamber 38. A mulling shaft 56 is fixed to and is rotatable by the rotative means 13 and lies snugly but rotatably within the shaft opening 53. The rightward end of the mulling shaft 56 defines a mulling head 57 having a substantially conical rightward end which defines a mulling surface 58. The surface 58 is preferably provided with a rounded apex or nose portion 60. The leftward portion 59 of the mulling head 57 is substantially cylindrical and is of somewhat less diameter than the shaft opening 53. An annular groove 61 is provided between the mulling head 57 and the remainder of the shaft 56. The portion 59 and the groove 61 define, along with the peripheral wall of shaft opening 53, an annular transfer passageway 63. A coaxial coolant passage 62 (FIGURE 2) extends from the mulling head 57 leftwardly through the leftward end of the shaft 56.

A generally cylindrical mulling block 66 (FIGURE 3) is snugly but removably disposed within the enlarged portion 33 of the central opening 32 and is externally grooved at 67 for receiving a cooling fluid. The mulling block 66 has an annular sleeve 68 surrounding the groove 67 for preventing escape of coolant therefrom, said sleeve 68 preferably is welded to the mulling block 66. The mulling block 66 has a coaxial and rightwardly opening passage 69 which preferably forms a smooth extension of the ram chamber 38 and communicates therewith. The passage 69 opens divergently through the leftward end of the mulling block 66 to form a conical seat 71 adjacent to and coaxial with the conical mulling surface 58 on the mulling head 57. The seat 71 and mulling surface 58 define a conical annular passage 72 therebetween connecting the ram chamber 38 with the transfer passageway 63. The slopes of the conical surface 58 and seat 71 are identical in the embodiment shown in FIGURE 2. However, with some materials it may be desirable to have different slopes on the surface 58 and the seat 71. Furthermore, the slopes should preferably lie within the range of a 30 to 80 degree angle relative to the rotational axis of the head 57. An outlet opening 74 extends preferably radially outwardly through the transfer block 51 and housing 24 from the transfer passageway 63 at a point axially adjacent the annular groove 61.

The grooves 37, 52 and 67 may be supplied with coolant liquids, such as water by any convenient means (not shown). Further, it is fully contemplated that said grooves may be interconnected and fed from a common source or may be individually fed for individually controlling temperatures of the zones defined by the blocks 36, 51 and 66. If desired, a suitable heating element (not shown) may be disposed around said housing 24 in a conventional manner for warming the machine 10, such as after a period of disuse.

Many alternate means may be employed to move the plasticized material from the outlet opening 74 to a suitable utilizing means, here to an injection mold. Here an injection assembly 76 (FIGURE 2), which is substantially similar to the injection assembly of my Patent No. 3,192,299, is disposed between the outlet opening 74 and a suitable mold part 77. The injection assembly 76 includes a valve block 79 supported in a fixed position with respect to the base structure 16 by any convenient means (not shown). The valve block 79 contains a pair of transversely intersecting passages 81 and 82 which extend therethrough. The passage 82 connects with the outlet opening 74 through a tubular member 83. A valve actuating pressure fluid cylinder 84 is supported on the valve block 79 and has a reciprocable valve rod 86 extending into the passage 82 at the end thereof opposite said outlet opening 74. The valve rod 86 has a sloped end 87 which is positionable by actuation of the valve cylinder 84 to close the rightward end of the passage 81 and connect the outlet opening 74 to the leftward end of the passage 81. The valve rod 86 also has an opening 88 therethrough at a point spaced from said sloped end 87 which when aligned coaxially of the passage 81 connects the ends thereof and prevents communication thereof with the passage 82. An injection cylinder 91 has an injection ram 92 reciprocable therein and extends leftwardly from the valve block 79. The injection cylinder 91 has an opening 93 communicating with the leftward end of the passage 81. The rightward end of the passage 81 is terminated in the sprue opening 97 which communicates with the mold half 77.

The rotation means 13 may be of any convenient type capable of intermittently rotatably driving the mulling shaft 56. In the particular embodiment shown, a base plate 101, fixed by any convenient means with respect to the base of structure 16 of the plasticizing unit 12, supports a pair of spaced axially aligned bearing blocks 102 and 103. The leftward bearing black 102 preferably supports a suitable radial bearing (not shown) and the rightward bearing block 103 preferably supports suitable radial and axial thrust bearing means here comprising an angular double row bearing 107. A drive shaft 108 is rotatably disposed in the bearings and carries suitable drive means, such as the pulley 109, for rotation therewith. The pulley 109 is rotatably drivable by any convenient rotary power means (not shown), which power means is controlled by any convenient means so as to stop or brake the head 57 whenever the injection ram 92 is energized to inject material through the sprue opening 97 into the mold. The drive shaft 108 has a coaxial coolant passage 111 extending therethrough and is connectible at its leftward end through a rotary joint (not shown), to a coolant source such as a water tap. The leftward end of the mulling shaft 56 is telescoped within a coaxial recess 112 in the rightward end of the drive shaft 108 and is prevented from rotational motion with respect thereto by key means indicated at 113. A suitable seal 114 is provided to prevent escape of cooling liquid and to constrain same to the communicating coolant passages 111 and 62.

It will be apparent that the conical passage 72 between the mulling head 57 and seat 71 may be varied in cross-sectional thickness without disassembling the machine 10 by any of several convenient means. Such adjustment, for example, may be made by moving the means 13 axially of the housing 24. In the particular embodiment shown, on the other hand, the mulling shaft 56 is threaded at 116 adjacent the drive shaft 108. A nut 117 is threaded on the threaded portion 116 and is adapted to be urged against the rightward end 118 of the drive shaft 108 by the pressure exerted on the plastic material by the ram 41. Thus, the nut 117 functions as an adjustable stop whereby adjustment thereof controls the space between the mulling head 57 and the seat 71.

The reciprocating means 14 here comprises a support structure 121 fixed by a convenient means, not shown, with respect to the base structure 16 and which supports a suitable pressure fluid cylinder 122 having a leftwardly extending output plunger 123 preferably coaxially aligned with the feed ram 41. A cylindrical head portion 124 on the rightward end of the feed ram 41 lies within and is radially removable from a U-shaped slot 126 in the output plunger 123 while the adjacent portion of the feed ram 41 lies within and is radially removable from a smaller U-shaped slot 127 communicating with the slot 126.

Operation

Operation of the device 10 embodying the invention is initiated with the mulling shaft 56 rotating and the feeding ram 41 withdrawn to its rightward position shown. The mulling shaft 56 may be rotated in either a clockwise or counterclockwise direction as desired and without substantially affecting the operation of the machine 10. A typical range of rotational speeds for the mulling shaft 56 is from 500 to 2000 r.p.m. but, of course, slower or faster speeds may be selected as desired. The injection ram 92 is preferably, but not necessarily, in its rightwardmost position shown and the valve rod 86 is positioned as shown for connecting the outlet opening 74 with the injection cylinder 91. Material to be plasticized, which may be in a granulated or powder form may be fed from the hopper 46 through the feed openings 42 and 43 and into the ram chamber 38. The hopper 46 is thereafter closed by the feed ram 41 as it is moved leftwardly by application of pressure fluid to the pressure cylinder 122. The feed ram 41 forces material within the chamber 38 leftwardly into contact with the apex 60 of conical mulling surface 58 and thence through the passage 72 between said surface and conical seat 71 where the relative rotation therebetween causes frictional heating of said material to plasticize same. The perpendicular distance between the mulling surface 58 and conical seat 71 may be varied over a wide range by axial adjustment of the mulling shaft 56 with respect to the seat 71 to adapt the machine 10 to a wide variety of materials. However, a typical clearance is about .010 inch. The narrowness of the passage 72 and the high rotational speed of the conical head 57 permits the material to be heated and plasticized very rapidly. The machine 10 may be further adapted to said variety of materials by varying the ram pressures of the rams 41 and 92 and the rotational speed of the shaft 56. The tangential speed differential acting on the material being plasticized as it travels between the opposing surfaces of the mulling head 57 and seat 71 increases as the material travels radially outwardly (leftwardly in FIGURE 2) from the apex 60. When the surface 58 and seat 71 are substantially conical and have the same slope, this results in an increased intensity of frictional working as said material moves leftwardly through the passage 72. This effect may be lessened, if desired, by lessening the slope of the surface 58 and seat 71 to approach a cylindrical configuration or may be increased by increasing said slope so that the mulling passage 72 approaches a radially planar configuration. Depending upon the type of material being utilized, the slope or angle relative to the rotational axis of the head 57 should preferably lie within the range of 30 to 80 degrees. Furthermore, the average intensity at which the material is worked may be varied by providing an angular off-set between the seat 71 and the surface 58. It is further contemplated that the surface 58 and seat 71 may be other than conical and may be described, for example, by a paraboloid or other revolving conic section or any other configuration desired. It will therefore be apparent that the apparatus of the invention is capable of meeting a wide variety of plasticizing requirements merely by adjustment of the shape of the surface 58 and the seat 71. The mulling shaft 56 and mulling block 66 are quickly and inexpensively constructable and modifiable with widely available basic tools, such as a small metal lathe and, hence, the machine 10 may be readily provided with additional specialized mulling shafts 56 and blocks 66, if desired, although such specialized elements should rarely be required.

Plasticized material leaving the conical passage 72 is pushed by succeeding material through the annular passageway 63 and outlet opening 74 into the injection cylinder 91. The ram 92 is preferably slowly retracted by suitable power means, not shown, to admit the plasticized material into the injection cylinder 91. In certain cases the ram 92 may be left in a comparatively free state whereby the entering material pushes said ram 92 leftwardly. In other cases, said ram 92 may be left in its leftwardmost position so as not to be contacted by the incoming plasticized material. After the ram chamber 38 has been emptied of material the ram 41 may be retracted and another charge of material may be placed in the chamber 38 for plasticizing. In this way one or several charges of the ram chamber 38 may be placed in the injection cylinder 91. When the cylinder 91 is charged to the extent desired, the rotating conical head 57 is stopped and the valve rod 86 is extended by the cylinder 84 to block the passage 82 and to open the passage 81 whereafter the injection ram 92 may be extended rightwardly to force the plasticized material within the injection cylinder 91 through the opening 93, passage 81 and sprue 97 and into the mold. This completes a cycle in the operation of the machine 10.

As is apparent from the above description, the rotation of the plasticizing head 57 is interrupted during each cycle of operation of the molding device, the head 57 being rotated to supply sufficient plasticized material to the injection apparatus so as to perform a single molding operation, the rotating head then being stopped during the performance of the actual injection operation. The machine thus does not require an intermediate accumulation chamber since plasticized material is not continuously supplied thereby but rather is intermittently supplied in quantities as required for the actual molding operation being performed. Such intermittent operation, while unsuccessful in prior plasticizing machines, is particularly well adapted to the plasticizing machine of the present invention since the narrow conical plasticizing zone 72 permits the material to be rapidly heated and cooled and thus the intermittent operation of the rotating conical head 57 does not cause a deterioration of the materials contained within the plasticizing region.

The plasticizing unit 12 is readily disassembled as for cleaning and the like. For example, the screws 17 may be removed and the mounting plate 15 may be moved rightwardly with respect to the base structure 16 to disengage the mulling shaft 56 from the opening 53, such movement telescoping the feed ram 41 into the chamber 38, whereafter the shaft 56 may be pulled from the drive shaft 108. Removal of the caps 20 and 25 allows the housing 24 to be lifted from the members 18 and 19, the rightward end of the ram 41 rising out of the slots 126 and 127 in the plunger 123. Removal of the screws 31 allows the housing 24 to be separated into its parts 28 and 29 and allows the mulling block 66 to be removed therefrom.

*Modifications*

Figure 4:
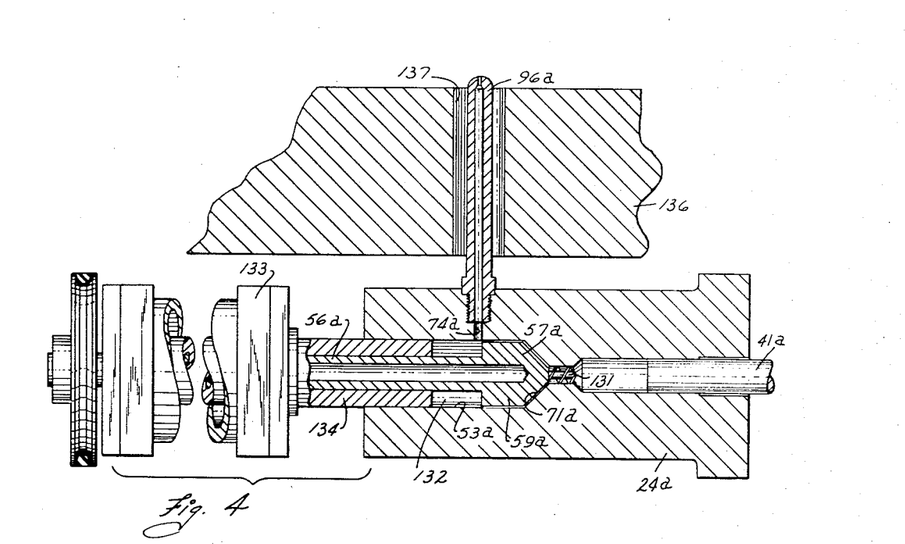
FIGURE 4 is a view, substantially in central cross section, of a modified injection molding machine embodying the invention.

FIGURE 4 discloses a modified form of the machine described hereinabove. A supplementary screw 131 is provided integral with the apex of the rotatable mulling head 57a to assist movement of the plasticizable material therepast. The cylindrical portion 59a of the mulling head 57a is increased in diameter to come within a relatively close tolerance of the surrounding wall of the shaft opening 53a so that working of the material now extends from the conical zone defined by the seat 71a through the cylindrical zone surrounding the portion 59a. The remainder of the mulling shaft 56a extending leftwardly from the mulling head 57a is of considerably reduced diameter to provide an annular chamber 132 between said shaft 56a and the peripheral wall of the shaft opening 53a. A pressure fluid cylinder 133 actuates a cylindrical hollow plunger 134 extending therethrough which snugly and coaxially surrounds the shaft 56a and is snugly reciprocably received in the shaft chamber 53a. A platten 136 is disposed adjacent the housing 24a for holding a mold in a conventional manner and has an opening 137 therethrough and extending radially from the housing 24a. A cylindrical nozzle 96a connects the outlet opening 74a of the chamber 132 with said mold.

Operation of the modified structure of FIGURE 4 is substantially similar to that of the preferred embodiment of the invention described hereinabove with the exceptions noted below. The screw 131 assists (or opposes where an extreme amount of working is desired) the feed ram 41a in moving material to be plasticized through the space between the seat 71a and the mulling head 57a. The cylindrical part 59a assists the mulling head 57a in further working the material. Further, plasticized material is stored directly behind the mulling head 57a rather than being moved to a separate injection cylinder area. As a result, when the space 132 has been sufficiently filled with plasticized material, the mulling head 57a is stopped and the ram 134 is moved rightwardly which forces the material out of the chamber 132 through the opening 74a and cylindrical nozzle 96a.

Leakage from the space 132 past the seat 71a due to increased pressure in the chamber 132 may be substantially prevented by allowing a small amount of axial play in the shaft 56a whereby the increased pressure in the chamber 132 acts upon the leftward side of the head 57a and moves same rightwardly into contact with the seat 71 thereby to effect a hydraulic valve closure action.

Figure 5:
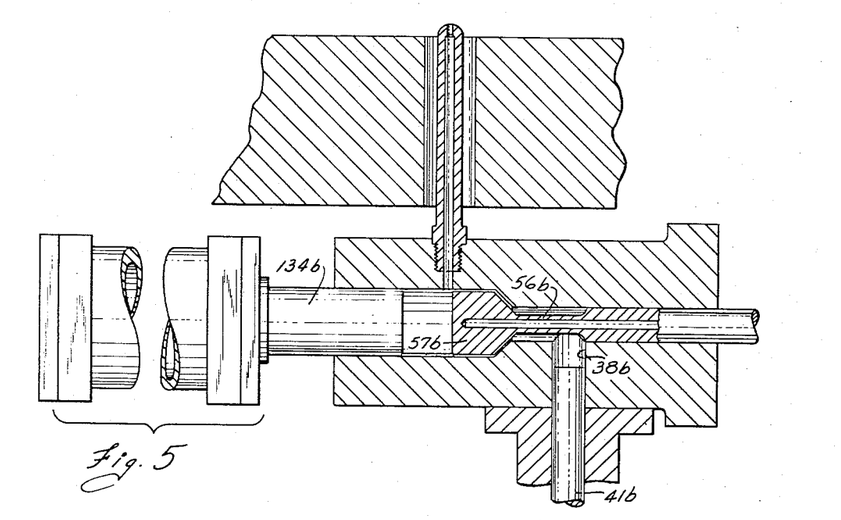
FIGURE 5 is a view similar to FIGURE 4 showing a further modification.

FIGURE 5 discloses a further modification which is essentially similar to the above-described device of FIGURE 4 except that the mulling head 57b is rotated from the apex end thereof and the ram 134b is solid rather than sleeve-shaped. The feed ram 41b, because of the apex drive connection of the mulling head 57b, can no longer be axially disposed with respect to said mulling head and instead is reciprocable in a ram chamber 38b disposed at right angles to the axis of the mulling head 57b and located close thereto. The mulling shaft 56b is of reduced diameter between the ram chamber 38b and the mulling head 57b to allow passage of material therepast. The operation is substantially similar to that of FIGURE 4 and needs no further description.

Figure 6:
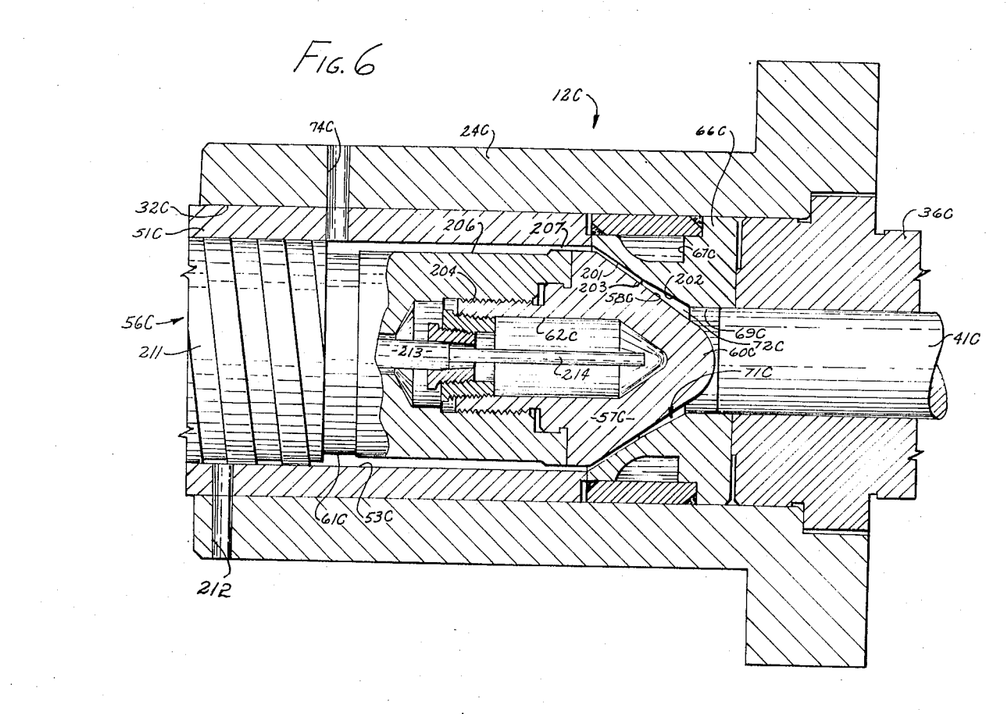
FIGURE 6 generally corresponds to an enlarged fragment of FIGURE 3 and discloses a modification.

FIGURE 6 discloses a modified plasticizing unit 12c which is generally similar to the plasticizing unit 12 above described with respect to FIGURES 1, 2 and 3 in having a hollow housing 24c defining a central opening 32c along which are sequentially and coaxially disposed a feed block 36c, a mulling block 66c and a transfer block 51c, such blocks having coaxial openings. Further, a ram 41c is axially reciprocable along and within the feed block 36c for urging plasticized material from an inlet, not shown, corresponding to the inlet 43 of FIGURE 3, leftwardly toward the mulling block 66c. A mulling shaft 56c extends into the central opening 53c in the transfer block and is rotated by any convenient motor source, not shown. The shaft 56c is grooved at 61c opposite an outlet 74c which extends through the transfer block 51c and housing 24c. A mulling head 57c, having a conical mulling surface 58c, is coaxially fixed to the rightward end of the mulling shaft 56c and extends into a recessed seat 71c in the mulling block 66c. In the particular embodiment shown, a coolant passage 67c is provided in the mulling block 66c as in the embodiment of FIGURES 1, 2 and 3. Also, the mulling head 57c is provided with a coolant chamber 62c which is fed and exhausted through suitable concentric conduits 213 and 214 disposed in the shaft 56c.

The modified plasticizer 12c differs from the plasticizer 12 of FIGURES 2 and 3 in a number of ways. More particularly, the leftwardly facing, generally conical seat 71c in the mulling block 66c of FIGURE 6 is formed by two coaxial frusto-conical surfaces 201 and 202. The surfaces 201 and 202 diverge leftwardly and have coincident ends forming a ridge 203 in the seat 71c. Thus, the large diameter end of the surface 202 joins the small diameter end of the surface 201. The surface 201 at the wide end of the seat 71c defines a greater angle with the axis of the hub block 66b than does the surface 202 at the small end of the seat 71c. In the particular embodiment shown, the surface 201 lies at a 35 degree angle to the axis of the seat 71c and the surface 202 lies at a 30 degree angle to said axis. The rightward end of the surface 202 communicates through the central opening 69c with the central opening of the feed block 36c so that the feed ram 41c may be driven leftwardly into close proximity with the mulling head 57c as indicated in FIGURE 6.

The conical mulling surface 58c on the head 57c corresponds in slope to the larger diameter seat surface 201. Thus, the surfaces 202 and 58c diverge rightwardly or radially inwardly, here at an angle of five degrees. The annular passage 72c defined between the mulling head 57c and the seat 71c thus is radially widest at its rightward end and becomes less wide as the ridge 203 between the surfaces 201 and 202 is approached. The annular passage 72c then continues at a constant, smaller, width throughout the length of the surface 201. Normally, the rounded nose 60c of the mulling head extends rightwardly beyond the seat 71c.

Thus, plasticizable granules, not shown, are forced leftwardly toward the mulling head 57c by the ram 41c and past the nose of the mulling head 57c into the widened rightward end of the mulling zone 72c. The rightward end of the zone 72c preferably is wider than the largest granules to be mulled so that the granules radially enter the zone 72c. As the granules are forced leftwardly along the narrowing rightward portion of the zone 72c, they are eventually forced against the relatively rotating surfaces 202 and 58c, thus undergoing substantial friction working. The larger granules are reduced in size and softened as they proceed leftwardly along the surface 202. The narrower portion of the zone 72c is dimensioned to frictionally work even the smallest expected granules. The granules are softened and sufficiently reduced in size as they are forced leftwardly along the surface 202 and they can be forced into the leftward portion of the zone 72c opposite the surface 201 for further plasticizing. The material becomes more consistently plastic and is more vigorously worked as it passes toward the leftward end of the zone 72c as a result of the increased peripheral speed of the head 57c near its maximum diameter. The variable sloped wall of the seat 71 is particularly desirable in that it enables relatively large granules to be freely admitted to the plasticizing zone 72c and yet maintains the latter portion of said zone narrow enough for optimum frictional working on the material.

The mulling head 57c includes a reduced diameter, threaded, portion 204 defining the leftward end thereof which is threadedly received in a central recess in the rightward end of the shaft 56c. The diameter of the shaft 56c is reduced to define an elongated cylindrical zone 206 which extends from a point near the mulling head 57c leftwardly to the reduced diameter groove 61c. In the particular embodiment shown, the internal diameter of the central opening 53c is four inches, the external diameter of the mulling head is three and three-quarters inches, the external diameters of the cylindrical zone 206 is three and five-eighths inches and the external diameter of the groove 61c is three and one-half inches.

The material passes leftwardly from the mulling zone 72c into a zone 207 partially bounded by the periphery of head 57c and shaft 56 to the right of the reduced diameter cylindrical portion 206 of the mulling shaft. The rate of axial flow of the plastic material is reduced here because of the increased spacing between the mulling head 57c and the transfer member 51c in the zone 207. However, the high peripheral speed of the mulling head still results in some working of the material. In view of the slower flow, however, an increased time is allowed for transfer of heat between more heated and less heated portions of the plastic mass to compensate for the relatively slow heat transfer rate through the plastic material and thereby tends to render the whole mass of uniform temperature throughout.

The mass is then moved further leftwardly along the reduced diameter cylindrical portion 206. The further spacing of the mulling shaft periphery and the wall of the opening 53c further slows the plastic flow and consequently still further increases the homogenity of the mass and the uniformity of its temperature. Thus, after the mass has travelled along the relatively long and wide zone defined by the cylindrical part 206, it is heated to a temperature which is essentially the same throughout the mass. The material enters the groove 61c and is then urged radially out of the housing through the outlet opening 74c as in the embodiments of FIGURES 1 through 3.

The plasticizer 12c differs further from the embodiment of FIGURES 1, 2 and 3 in that the shaft 56c to the left of the groove 61c is provided with a helical thread 211 of shallow rectangular cross section. The hand of the thread and the direction of rotation of the shaft 56c are so related that the thread 211 will tend to urge leftwardly a small amount of plastic material to assist both in lubricating the rotor and to seal the leftward end of the groove 61c. In the particular embodiment shown, the thread is a right-hand thread and the preferred direction of rotation of the mulling head in clockwise as seen from the leftward end thereof in FIGURE 6. A waste outlet 212 extends radially outwardly from the central opening 53c through the walls of the transfer member 51c and housing 24c and is spaced leftwardly along the shaft 56c from the groove 51c. The waste outlet allows escape of whatever plastic material is moved leftwardly as above mentioned.

Where the plasticizer of the invention is to be used for supplying an extrusion die rather than an injection machine, the feed ram, ram 41 in FIGURE 3 or 41c in FIGURE 6, may be replaced by a continuously operating screw. A screw for this purpose is a somewhat less effective pressure creating device than a ram but will be sufficiently effective for most extrusion requirements. Where a screw will not create enough pressure to drive the plastic material effectively past the plasticizing cone, the rams 41 and/or 41c may be replaced by a plurality of sequentially acting rams for providing a continuous supply of raw plastic material under pressure to the plasticizing cone somewhat as shown in my Patent No. 3,245,116.

Although particular preferred embodiments of the invention have been disclosed above for illustrative purposes, it will be understood that variations or modifications which lie within the scope of the appended claims are fully contemplated.

The embodiments of the invention in which an exclusive property or privilege is claimed are defined as follows:

1. In a plasticizing device, the combination comprising:
    head means having a sloped surface adjacent one end thereof;
    a seat coaxial with said head means and spaced opposite and closely adjacent to said sloped surface and defining therewith a substantially annular axially elongated passage which increases in diameter from one axial end toward the other axial end thereof, the radial thickness of said passage being small throughout the entire length thereof;
    means for rotating one of said head means and seat with respect to the other; and
    feeding means for forcing material to be plasticized between said sloped surface and said seat at one said axial end of said passage whereby to frictionally work said material for plasticizing same as same flows radially outwardly between said surface and said seat through said passage.

2. The device defined in claim 1, in which the sloped surface of said head means defines an angle of 30 to 80 degrees with respect to the rotational axis of the head means and seat with respect to the other.

3. The device defined in claim 1, in which said head means has a conical portion defining said sloped surface and said seat has a first frusto-conical surface of axial slope identical to that of said head means and a second frusto-conical surface having a slope less than that of said first surface and disposed adjacent the small diameter end thereof, said conical portion of said head means extending past said first and second surfaces, the annular axially elongated passage between said head means and seat being widened at the small diameter end of said second conical surface for admitting large diameter plasticizable granules to the plasticizing zone.

4. In a plasticizing device, the combination comprising:
    head means having a sloped surface adjacent one end thereof;
    a seat coaxial with said head means and spaced opposite and closely adjacent to said sloped surface and defining therewith a substantially annular, axially elongated passage;
    means for rotating one of said head means and seat with respect to the other;
    feeding means communicating with the entire circumferential extent of said passage at one axial end thereof for forcing material to be plasticized radially outwardly between said sloped surface and said seat whereby to frictionally work said material for plasticizing same;
    means defining a passageway at the axial end of said sloped surface remote from said feeding means, said passageway communicating with the passage between said sloped surface and said seat for receiving material exiting from said passage;
    injection means connected to said passageway for injecting said material into a mold;
    whereby said material will be plasticized by rotation of said sloped surface with respect to said seat and thereafter molded under closely controllable conditions.

5. The device defined in claim 4, in which the sloped surface of the head means defines an angle of 30 to 80 degrees with respect to the rotational axis of said head means and seat with respect to the other.

6. In an injection molding machine for plasticizing material and injecting same into a mold, the combination comprising:
    a housing having an opening extending therethrough, said opening having a first substantially cylindrical portion at one end thereof and having a second substantially cylindrical portion of smaller diameter at the other end thereof, said first and second portions being joined by at least one substantially conical portion;
    a ram for introducing material to be plasticized into said second portion and positively urging same toward and radially outward past said conical portion;
    a shaft snugly disposed within said first portion and means for rotating said shaft relative to said housing, said shaft having a tapered surface lying adjacent to and being substantially surrounded by said conical portion of said opening;
    means defining a passageway at the end of said tapered surface opposite said ram, said passageway communicating with the space between said tapered surface and said conical portion of said opening;
    injection means connected to said passageway for receiving material pushed by said ram past said tapered surface into said passageway and injecting said material into the mold;
    whereby said material will be plasticized by rotation of said tapered surface with respect to said conical portion.

7. In an injection molding machine for plasticizing material and injecting same into a mold, the combination comprising:
    housing means defining a conical seat and a feeding passageway connected to the apex of said conical seat;
    head means rotatable with respect to said seat, said head means having a conical surface facing said conical seat, the space between said conical surface and said seat defining a mulling zone, the plasticized material passing radially outwardly through said zone;
    feeding means for introducing material to be plasticized into said feeding passageway and for positively urging same toward said mulling zone;
    means defining a passageway communicating with that side of said mulling zone opposite said feeding passageway for receiving material exiting from said mulling zone; and
    injection means operable on material within said passageway for injecting same into a mold.

8. The device as defined in claim 7, in which the conical surface of said head means defines an angle of between 30 and 80 degrees with respect to the rotational axis of said head means.

9. In an injection molding machine for plasticizing material and injecting same into a mold, the combination comprising:
- a housing having an opening extending therethrough, said opening having a first substantially cylindrical portion at one end thereof and having a second substantially cylindrical portion of smaller diameter at the other end thereof, said first and second portions being joined by a substantially conical portion;
- means for introducing material to be plasticized into said second portion;
- a ram snugly and slideably telescoped in said second portion for reciprocation therealong and means for reciprocating said ram, whereby said material may be pushed toward and radially outward past said conical portion of said opening;
- a rotatable shaft snugly disposed within said first portion and means for rotating said shaft, said shaft having a tapered surface lying adjacent to and being substantially surrounded by said conical portion of said opening so as to define a zone therebetween;
- means defining a transfer passageway at the end of said tapered surface opposite said ram, said transfer passageway communicating with the zone between said tapered surface and said conical portion of said opening for receiving material exiting from said zone;
- injection means connected to said transfer passageway for injecting said material into the mold;
- whereby said material will be plasticized by rotation of said tapered surface with respect to said conical portion and thereafter molded under closely controllable conditions.

10. The device defined in claim 9, wherein said first portion of said opening is cylindrical, the part of said shaft adjacent said tapered surface is of reduced diameter with respect to the remainder of said shaft, and reduced diameter part and the peripheral wall of said opening defining said transfer passageway, said reduced diameter part of said shaft including an annular groove spaced from said tapered surface, said housing including an outlet passage communicating between said transfer passageway adjacent said groove and said injection means whereby material is moved through said transfer passageway without significant additional working.

11. The device defined in claim 10, in which said reduced diameter part comprises a first relatively narrow portion immediately adjacent said tapered surface and a second relatively elongated portion adjacent said groove, said elongated portion being intermediate in diameter between said groove and said remainder of said shaft.

12. The device defined in claim 9, wherein said housing comprises a pair of axially separable parts, at least one of the adjacent faces of said parts having a recess therein for defining a radially enlarged portion of said opening, said recess extending at least to the axial ends of said conical portion of said central opening;
- means including a block removably disposed in said recess, said block having a passage therethrough defining at least said conical portion of said opening; and
- releasable means for holding said axially separable parts in an assembled condition;
- whereby said conical portion can be readily removed and replaced.

13. In an injection molding machine, the combination comprising:
- a head having a substantially conical surface thereon at one end thereof and having an axially extending shaft at the other end thereof;
- a fixed, substantially conical seat adjacent and radially surrounding said conical surface;
- rotation means for rotating said shaft;
- a feeding ram and means defining a ram chamber in which said ram is reciprocably supported, said ram chamber communicating with the apex of said conical surface for forcing material radially outwardly between said seat and said conical surface to plasticize said material;
- means defining an annular passageway coaxially surrounding said shaft and communicating with the space between said conical surface and said seat for receiving material moved therethrough by said feeding ram;
- an output ram snugly and coaxially surrounding said shaft and snugly but slideably reciprocable in said annular passageway;
- means defining an outlet from said annular passageway adjacent said head and a mold connected thereto;
- whereby axial movement of said output ram toward said head will force material within said annular passageway through said outlet into said mold.

14. In a plasticizing device, the combination comprising:
- head means symmetrical about an axis and having a surface adjacent one end thereof extending at an acute angle with respect to said axis;
- a seat coaxial with said head means, said seat being symmetrical about the axis thereof and being spaced opposite and closely adjacent said surface, the space between said surface and said seat defining a plasticizing zone which increases in diameter from one end to the other end thereof;
- means for rotating one of said surfaces and said seat with respect to the other;
- positive feeding means for forcing material to be plasticized into said one end of said plasticizing zone and thence radially outwardly through said plasticizing zone; and
- means receiving said plasticized material from said zone and molding same.

15. The device defined in claim 14, in which said surface on said head means defines an angle of 30 to 80 degrees with respect to the rotational axis of said surface and said seat with respect to the other.

16. The device defined in claim 14, in which said seat and head means diverge from each other adjacent the inlet end of said plasticizing zone to enable the zone to readily receive granules of plasticizable material of diameter exceeding the distance between the seat and head means in the remaining portion of said zone.

17. The device defined in claim 14, including screw means fixed with respect to and axially displaced from said head means in a direction away from said seat and displaced from said seat beyond said means receiving said plastic material and further including means defining a waste outlet spaced from said receiving means and in communication with said screw, and still further including means rotatably driving said head means in a direction such that the screw tends to impel plastic material away from said receiving means and toward said waste opening, said waste material disposed in said screw acting to lubricate the rotation of said head means and acting as a seal axially of said screw.

18. The device defined in claim 14, in which said positive feeding means comprises a ram and cylinder means, said ram and cylinder means being, when said ram is in a retracted position, of substantially larger capacity than said plasticizing zone;
- whereby in any given cycle of operation a major part of the material occupying said cylinder at the beginning of said cycle will have passed through and out from said plasticizing zone at the end of said cycle.

19. The device defined in claim 14, in which said feeding means are of an intermittently acting type independent of said drive means; the volumetric capacity of said feeding means at the beginning of a cycle being substantially larger than the volumetric capacity of said plasticizing zone;

whereby a major part of the material contained within said feeding means at the beginning of a cycle will have passed through and out of said plasticizing zone at the end of a cycle.

20. The device defined in claim 14, including means defining a mixing zone axially spaced from said head means, said mixing zone being of greater radial thickness than said plasticizing zone to permit slower flow of plasticized material therethrough, said means receiving said plasticized material being disposed at the end of said mixing zone opposite said plasticizing zone.

21. The device defined in claim 14, wherein said feeding means includes a screw projecting from said head means and rotatable therewith for urging material to said mulling plasticizing zone.

22. The device defined in claim 14, wherein said feeding means includes a screw projecting from the apex of said head means and rotatable therewith for urging material to said mulling plasticizing zone.

23. In a plasticizing device, the combination comprising:

head means symmetrical about axis and having a working face adjacent one end thereof;

a seat coaxial with said head means, said seat being symmetrical about said axis and being spaced opposite and closely adjacent said face, one of said seat and face comprising first and second frusto-conical surfaces arranged in axial sequence, the large diameter of the first surface being joined to and equal to the small diameter of the second surface, the second of said surfaces corresponding in slope to the other of said seat and face and the first one of said surfaces diverging from the other of said seat and face, said head means and seat defining an annular plasticizing passage therebetween, said passage being widened at its small diameter end and narrowing toward its larger diameter end;

means rotating one of said head means and seat with respect to the other;

feed means for moving material to be plasticized into and radially outwardly through said plasticizing zone and means for receiving said plasticized material from said zone and molding same.

24. The device defined in claim 23, in which said first and second frusto-conical surfaces define said seat and said face of said head means is formed substantially as a cone coaxially opposed to said seat.

25. The device defined in claim 14, in which said feeding means includes a screw projecting coaxially from the apex of said head means for urging material to said plasticizing zone and for simultaneously balancing the thrust on said head means.

26. A plasticizing device according to claim 1, in which said feeding means comprises a reciprocable ram.

27. A plasticizing device according to claim 1, in which said feeding means comprises housing means defining a chamber coaxial with said head means and said seat, said chamber being in free communication with said one axial end of said passage, and a feeding ram reciprocable in said chamber.

28. A plasticizing device, comprising:

housing means having an opening extending therethrough, said opening having a substantially frusto-conical portion and a substantially cylindrical portion communicating with the small end of said frusto-conical portion;

a head having a substantially conical portion opposed to and spaced closely adjacent said frusto-conical portion and defining therewith a substantially annular passage which is open at its opposite ends;

means for effecting relative rotation of said frusto-conical portion and said head;

a ram reciprocable in said cylindrical portion for positively urging material to be plasticized through said passage so that said material will be plasticized by rotation of said head with respect to said casing; and means for receiving the plasticized material exiting from said passage and means for shaping said plasticized material.

29. A plasticizing device according to claim 28, in which said cylindrical portion communicates directly with and extends away from the small end of said frusto-conical portion.

30. A plasticizing device according to claim 28, in which said cylindrical portion is coaxial with said frusto-conical portion.

31. A plasticizing device according to claim 28, in which said housing means includes a passageway coaxial with said frusto-conical portion and connecting said frusto-conical portion and said cylindrical portion, and including a screw mounted on the small end of said head and extending axially in said passageway.

32. A plasticizing device according to claim 28, in which said cylindrical portion extends at an angle to the axis of said frusto-conical portion.

References Cited

UNITED STATES PATENTS

| | | | |
|---|---|---|---|
| 2,977,632 | 4/1961 | Bunch | 18—12 XR |
| 3,256,568 | 6/1966 | Stenger | 18—30 |
| 3,262,154 | 7/1966 | Valyl | 18—12 |

WILBUR L. McBAY, *Primary Examiner.*